(12) United States Patent
Hubbell

(10) Patent No.: US 8,806,954 B1
(45) Date of Patent: Aug. 19, 2014

(54) STEADY STATE METHOD TO DETERMINE UNSATURATED HYDRAULIC CONDUCTIVITY AT THE AMBIENT WATER POTENTIAL

(75) Inventor: Joel M. Hubbell, Idaho Falls, ID (US)

(73) Assignee: U.S. Department of Energy, Washington, DC (US)

( * ) Notice: Subject to any disclaimer, the term of this patent is extended or adjusted under 35 U.S.C. 154(b) by 401 days.

(21) Appl. No.: 13/297,333

(22) Filed: Nov. 16, 2011

Related U.S. Application Data

(60) Provisional application No. 61/414,019, filed on Nov. 16, 2010.

(51) Int. Cl.
*G01F 1/00* (2006.01)
(52) U.S. Cl.
USPC .................. 73/861; 73/863.23; 73/152.23
(58) Field of Classification Search
None
See application file for complete search history.

(56) References Cited

U.S. PATENT DOCUMENTS

| | | | | |
|---|---|---|---|---|
| 4,679,422 A | * | 7/1987 | Rubin et al. | 73/38 |
| 5,388,455 A | * | 2/1995 | Hamby et al. | 73/152.29 |
| 6,401,547 B1 | * | 6/2002 | Hatfield et al. | 73/861.04 |
| 6,957,573 B2 | * | 10/2005 | Faybishenko | 73/152.18 |
| 6,986,281 B1 | * | 1/2006 | Hubbell et al. | 73/152.01 |

\* cited by examiner

*Primary Examiner* — Harshad R Patel
(74) *Attorney, Agent, or Firm* — Jacob A. Heafner; Brian J. Lally; John T. Lucas

(57) ABSTRACT

The present invention relates to a new laboratory apparatus for measuring the unsaturated hydraulic conductivity at a single water potential. One or more embodiments of the invented apparatus can be used over a wide range of water potential values within the tensiometric range, requires minimal laboratory preparation, and operates unattended for extended periods with minimal supervision.

The present invention relates to a new laboratory apparatus for measuring the unsaturated hydraulic conductivity at a single water potential. One or more embodiments of the invented apparatus can be used over a wide range of water potential values within the tensiometric range, requires minimal laboratory preparation, and operates unattended for extended periods with minimal supervision.

12 Claims, 4 Drawing Sheets

STEADY STATE METHOD TO DETERMINE UNSATURATED HYDRAULIC CONDUCTIVITY AT THE AMBIENT WATER POTENTIAL

RELATIONSHIP TO OTHER PATENT APPLICATIONS

The current Non-Provisional Patent Application claims priority to U.S. Provisional Patent Application No. 61/414,019 filed on Nov. 16, 2010 which is hereby incorporated by reference in its entirety.

STATEMENT OF GOVERNMENTAL SUPPORT

The United States Government has certain rights in this invention pursuant to DOE Contract No. DE-AC07-05ID14517.

BACKGROUND

Knowledge of the vertical liquid flux rate in vadose zones is required for recharge investigations to evaluate contaminant travel times and estimate transport loading to underlying aquifers. The Darcian approach is commonly used as a first order analysis to estimate liquid flux in the vadose zone (Gee and Hillel, 1988; Allison et al., 1994; Stephens, 1996). In this approach, flux is estimated as the product of vertical hydraulic gradient and unsaturated hydraulic conductivity over a range of measured water potentials or water content. In the case where water potential is the same throughout the profile indicating uniform steady state drainage, then a unit hydraulic gradient exists and the unsaturated hydraulic conductivity is equivalent to the vertical flux (Black, et al., 1969; Sisson and van Genuchten, 1980). Water potential is the potential energy of water relative to pure free water including matrix, gravimetric, pressure, humidity and solute effects. In this discussion, the gravimetric and matric effects are considered the dominant forces.

Estimates of hydraulic conductivity can be developed from steady state techniques presented by Klute and Dirksen (1986). These methods rely on application of equal water potential or constant flux across a vertical core sample to produce a unit gradient, and measurement of the volume of water that enters and exits the sample per unit time. Porous plates used in these procedures may impede flow so the hydraulic gradients are confirmed using tensiometers in the sample. For the constant head test, the upper and lower heads are controlled by hanging water columns with water added using a Mariotte chamber apparatus. The short column version works with undisturbed or repacked, fine grained materials and requires less time to reach steady state conditions with thin samples (Klute and Dirksen, 1986). The volume or mass of water that drains from the bottom of the core is measured to estimate the flux at the measured water potential. The accuracy and range of measurements are controlled by the precision of the water measurement technique used in the test. The long column technique works with disturbed (repacked) samples, is generally limited to higher water contents, relatively coarse materials and requires extended time periods to establish steady state flow conditions (Klute and Dirksen, 1986).

The technique proposed herein is related to field approaches such as the crust method suggested by Hillel and Gardner (1970) and developed for field use by Bouma et al. (1971) where the water flux is maintained at a value below the saturated conductivity under steady flow. It is also similar to the sprinkler imposed steady state flux method (field) proposed by Youngs (1964).

The Darcian approach used to estimate flux is typically applied at shallow depths where water potentials fluctuate over a wide range in days to months, causing large changes in hydraulic gradients and hydraulic conductivity (Stephens and Knolton, 1986). The shallow oscillatory fluctuations also induce hysteresis, introducing additional error into the hydraulic conductivity estimates due to the non-linear relationship of the soil moisture characteristic curve. Large variations in water potential at these depths may necessitate the use of an instrument or a combination of instruments that sense over a wide range, but are less precise than direct measurement sensors (for example, a tensiometer). Measurements from near surface instruments are also often influenced by large temperature fluctuations. These temperature fluctuations influence the sensor's electronic output or the expansion and contraction of contained water in a tensiometer (Hubbell and Sisson, 1998). Conventional tensiometers located at shallow depths require greater field maintenance than instruments at deeper depths and may introduce systematic errors from diurnal and seasonal temperature variations. These problems are reduced by the use of advanced tensiometers which require less maintenance than standard tensiometers and are less affected by temperature fluctuations due to placement of the sensor near the point of measurement (Hubbell and Sisson, 1998).

Water potential measurements in sediments taken at greater depths typically will indicate a unit hydraulic gradient under steady state drainage conditions (Black et al., 1969). McElroy and Hubbell (2004) found that water potential measurements in a deep vadose zone (from 7- to 73-m depths) showed a near unit vertical hydraulic gradient and commonly exhibited near steady state water potentials. They also reported that tensiometer measurements in deep sedimentary interbeds at 34- to 73-m depths at a ponded infiltration site with high flows (over 340 m$^3$ day$^{-1}$) had hydraulic gradients from 0.94 to 1.04 during the ponding. This information supports the assumption of a near unit gradient under both ambient and induced recharge events. These water potential measurements in the deep vadose zones were all within the tensiometric range (Hubbell et al., 2002) and were either stable or gradually trending towards a stable condition suggestive that it is appropriate to assume steady-state vertical flow. From Richards' equation for vertical flow, steady state behavior can only occur when water potential gradients are negligible (uniform water potential with depth), and flow is driven solely by the gravitational component of the hydraulic gradient, which is unity.

Dirksen (1979) indicated that the most accurate water flux estimates are obtained under steady state conditions where the water contents do not change with time so that the water fluxes are equal to the externally measured inflow and outflow. Then the soil hydraulic conductivity curve ($K_u$) function can be determined by a series of steady state measurements. Montazer (1986), Gee and Hillel (1988), Scanlon et al. (1997) and Hubbell et al. (2004) noted that deep vadose zones in arid and semiarid environments typically exhibit minor and slow changes in water potentials over time.

Hubbell et al. (2004) concluded that the high degree of uncertainty associated with the mapping of water potential to the unsaturated hydraulic conductivity makes it difficult to estimate the distribution of flux in the deep vadose zone. They suggested that Darcian flux estimates could be improved if the unsaturated hydraulic conductivity estimates were more representative.

Two techniques, the steady state laboratory methods (Klute and Dirkson, 1986) and the ultracentrifuge method (Conca and Wright, 1990) are preferred over the transient methods such as the instantaneous profile (Watson, 1966), pressure-plate (Gardner, 1955), one-step outflow (Doering, 1965), and the methods by Ahuja and El-Swaify (1976) modified and discussed by Butters and Duchateau (2002). Steady state tests have advantages over multiple step tests in that they: 1) require just one constant pressure step to be performed, 2) reduce errors imparted by water potential changes within the sample, 3) reduce estimation errors from transient measurements, 4) ensure a unit gradient over the sample by the test design, and 5) produce resultant data that reflect the actual hydraulic conditions of the in situ sample. Performing the test at only one water potential/pressure also reduces the time to conduct this laboratory procedure.

The unsaturated hydraulic conductivity at a designated water potential also depends on whether the sample is wetting or drying. The hydraulic conductivity values on the drying curve are lower than on the wetting portion of the curve, and varies more from the wetting curve in coarser textured materials (Stephens, 1996).

Many investigations desire to estimate the liquid fluxes over a wide range of values that may be anticipated in the vadose zone. Scanlon et al. (1997) compiled water fluxes ranging from near zero to 60 cm yr$^{-1}$ in arid zone experiments using various estimation techniques. However, the typical range of fluxes anticipated for semi-arid sites are in the range of 0.1 to 10 cm yr$^{-1}$. This range corresponds to hydraulic conductivities from 3.2E-9 to 3.2E-7 cm sec$^{-1}$, assuming vertical flow and a unit hydraulic gradient.

The laboratory measured saturated hydraulic conductivity ($K_s$) is commonly employed for estimating the unsaturated hydraulic conductivity curve, but its use can have disadvantages. The saturated hydraulic conductivity test may have measurement errors from fluid channeling along the sidewall of the core, producing unrepresentative high values. This would bias the values plotted in the entire unsaturated hydraulic conductivity curve ($K_u$) because the saturated hydraulic conductivity is the upper end point of the $K_u$ curve.

One embodiment of the invention is a steady state measurement technique (and apparatus) for unsaturated hydraulic conductivity at a specified water potential [$K(\psi)$] at a specified water potential ($\psi$) representative of field conditions. The measured $K(\psi)$ can be used to develop the $K_u$ curve by using the $K(\psi)$ as a reference point instead of the $K_s$ which may vary orders of magnitude from the field unsaturated hydraulic conductivity.

SUMMARY OF INVENTION

A new laboratory apparatus and method for measuring the unsaturated hydraulic conductivity at a single water potential. One or more embodiment of the invented apparatus and method can be used over a wide range of water potential values within the tensiometric range, requires minimal laboratory preparation, operates unattended for extended periods with minimal supervision, and can be used on archived samples

Theoretical Design

The ambient liquid flux core measurement technique is based on one-dimensional flow under a unit hydraulic gradient (Sisson et al., 1980). Darcy's Law for one-dimensional vertical flow of water in porous material is:

$$j = -K(\Psi)\left(\frac{dH}{dz}\right) \quad (1)$$

where:
z=depth (positive downward),
$K(\psi)$=hydraulic conductivity as a function of water potential and,
H=hydraulic head=h (pressure head)−z (elevation head)
j=flux The hydraulic gradient dH/dz is composed of both elevation and water potentials so that if there is no change in water potential with depth, then the change in total head is only due to changes in elevation. For these conditions, the flux equals the hydraulic conductivity at the specified water potential (McElroy and Hubbell, 2004) so:

$$K(\psi) = j \quad (2)$$

The Methods and Materials section of this manuscript describes the components of the laboratory ambient flux measurements (LAFM) apparatus, and the technique used to conduct the tests. In a typical scenario, a core sample is collected in the field and run in the LAFM apparatus at the ambient water potential soon after collection. However, to demonstrate the use of this technique over a wider range of water potentials, a series of tests was conducted on two sediment samples over a range of water potentials. These tests are described in subsequent sections.

DETAILED DESCRIPTION OF THE INVENTION

Figure 1:
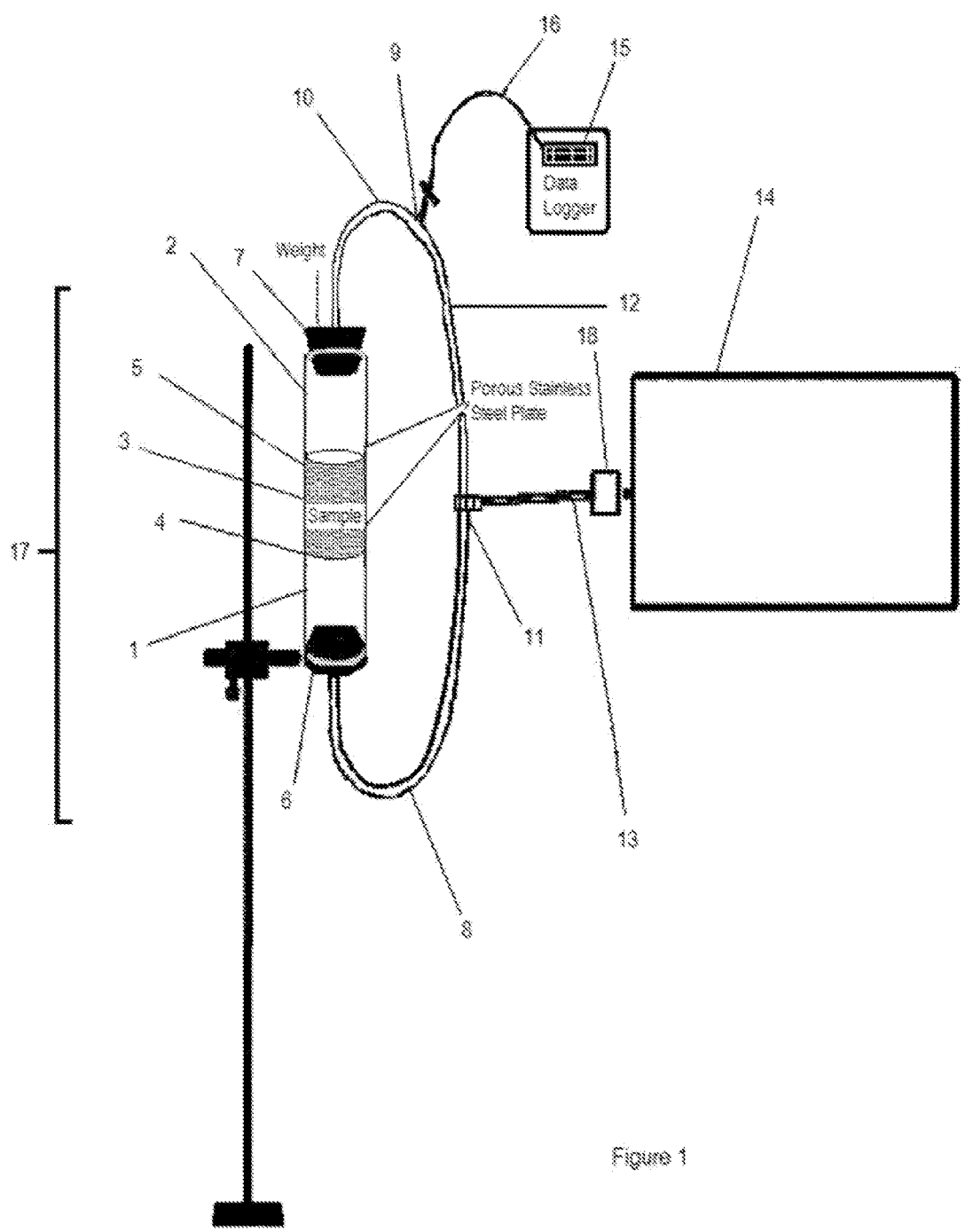
FIG. 1 is an illustration of a preferred embodiment of the invented Laboratory Ambient Flux Measurement apparatus.

The LAFM apparatus as illustrated in FIG. 1 shows one embodiment of the invention comprising: a sample container 17, a pressure transducer 9, a data logger 15, a vacuum source 14, a pressure regulator 18, a first gasket 6, a second gasket 7, a first tube 8, a second tube 10, a third tube 12, a fourth tube 13, and a connector 11;

wherein the sample container is comprised of a top reservoir 2, a bottom reservoir 1, a first porous plate 4, a second porous plate 5, and a sample chamber 3, wherein the sample chamber 3 is positioned between the top 2 and bottom reservoir 1;

wherein the bottom reservoir 1 is a cylinder having a upper section and a lower section;

wherein the top reservoir 2 is a cylinder having a upper section and a lower section;

wherein the sample chamber 3 is a cylinder with an upper section and lower section;

wherein the first porous plate 4 is positioned between the lower section of the sample chamber 3 and the upper section of the bottom reservoir 1, and wherein the second porous plate 5 is positioned between the upper section of the sample chamber 3 and the lower section of the top reservoir 2, wherein the lower section of the top reservoir 2 is coupled to the upper section of the sample chamber 3, and the upper section of the bottom reservoir 1 is coupled to the bottom section of the sample chamber 3;

wherein the lower section of the bottom reservoir 1 has an aperture that permits communication between the inside and outside of the bottom reservoir 1;

wherein the pressure transducer 9 has an first port, a second port and a data port;

wherein the first gasket 6 is coupled to the aperture located on the lower section of the bottom reservoir 1 creating a seal around the circumference of the of aperture on the lower section of the bottom reservoir 1;

wherein the connector 11 has a first, second and third inlet;

wherein the first gasket 6 has a central aperture, wherein the first tube 8 connects the central aperture of the first gasket 6 with the first inlet of the connector 11 having first inlet, a second inlet and a third inlet;

wherein the upper section of the top reservoir 2 has an aperture that permits communication between the inside and outside of the top reservoir 2;

wherein the second gasket 7 is coupled to the aperture located on the upper section of the top reservoir 2 creating to seal around the circumference of the of aperture on the upper section of the top reservoir 2;

wherein the second gasket 7 has a central aperture, wherein second tube 10 connects the central aperture of the second gasket 7 to first inlet of the pressure transducer 9;

wherein the third tube 12 connects the second port of the pressure transducer 9 with the second inlet of the connector 11;

wherein a pressure regulator 18 coupled to the vacuum source 14 is connected to the 11 connector's third inlet via the fourth tube 13;

wherein the data logger 15 is connected to the pressure transducer 9 via one or more wires 16.

Figure 2:
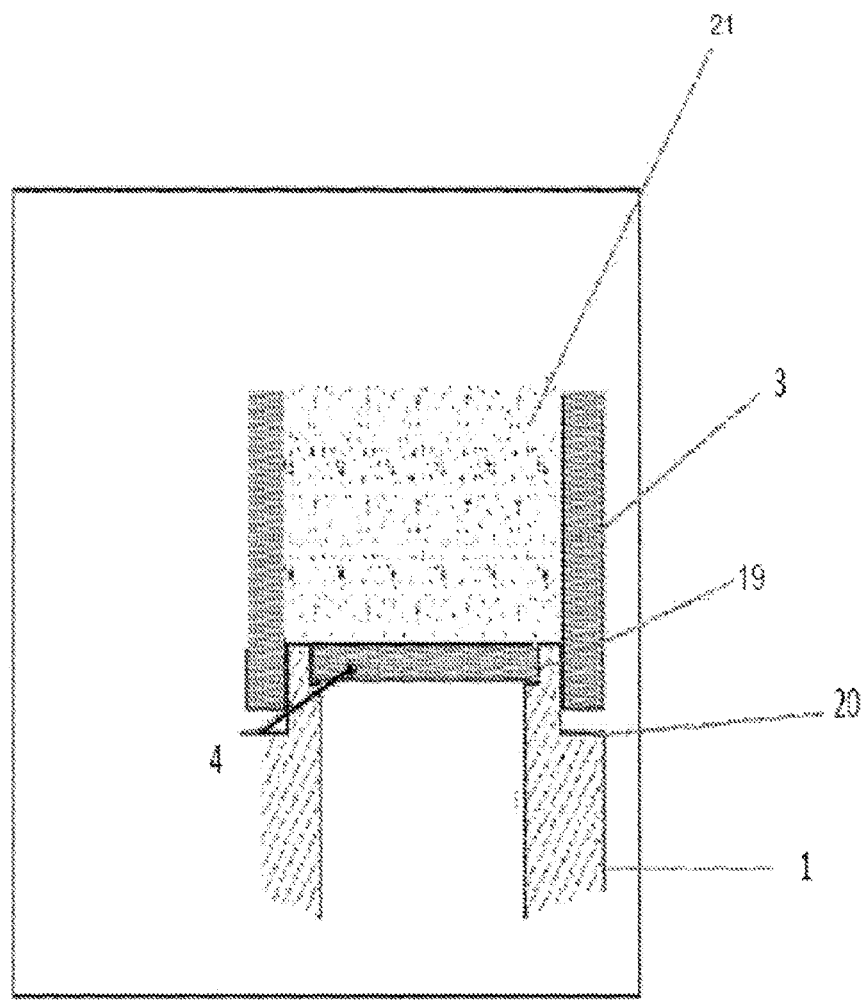
FIG. 2 illustrates one preferred embodiment of the details of the lower section of the sample container.

FIG. 2 illustrates one preferred embodiment wherein the first porous plate 4 sits upon the inner flange 19 of the upper end of the bottom reservoir 1 and wherein the sample chamber 3 holding a sample 21 sealingly engages the outer flange 20 of the upper end of the bottom reservoir.

Figure 3:
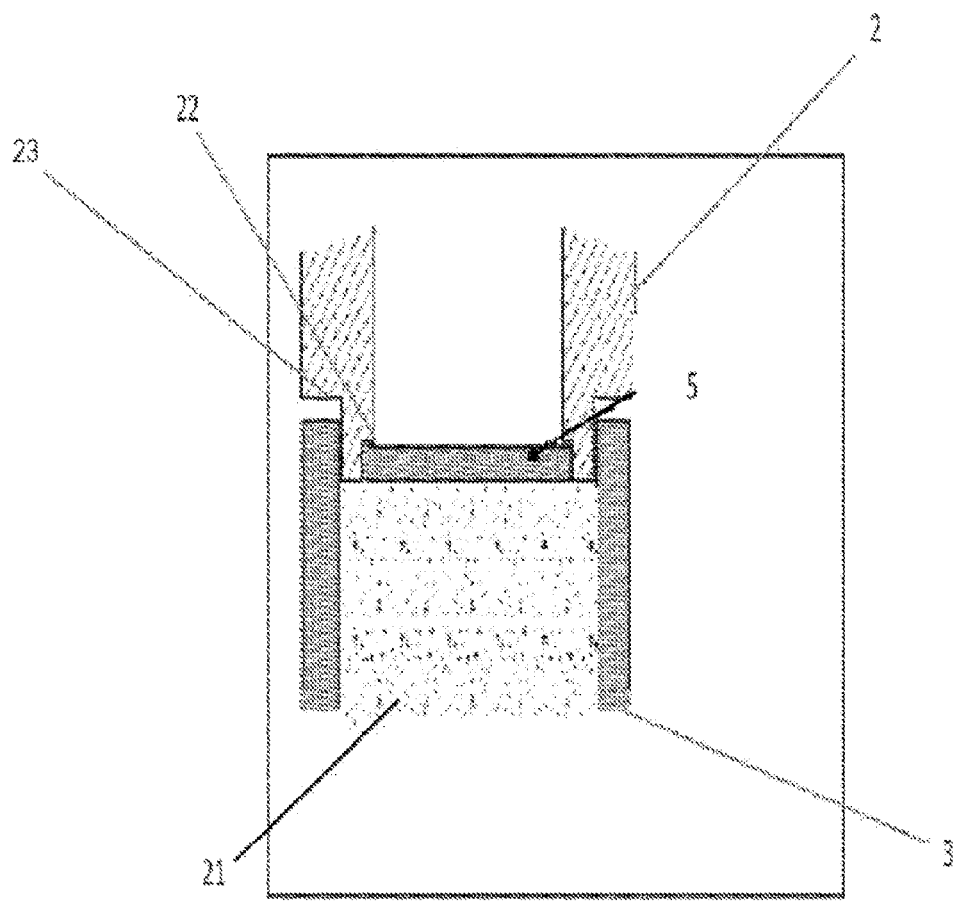
FIG. 3 illustrates one preferred embodiment of the details of the upper section of the sample container.

FIG. 3 illustrates one preferred embodiment wherein the second porous plate 5 sits within the inner flange 22 of the lower end of the top reservoir 2 and wherein the sample chamber 3 holding a sample 21 sealingly engages the outer flange 23 of the upper end of the bottom reservoir.

Figure 4:
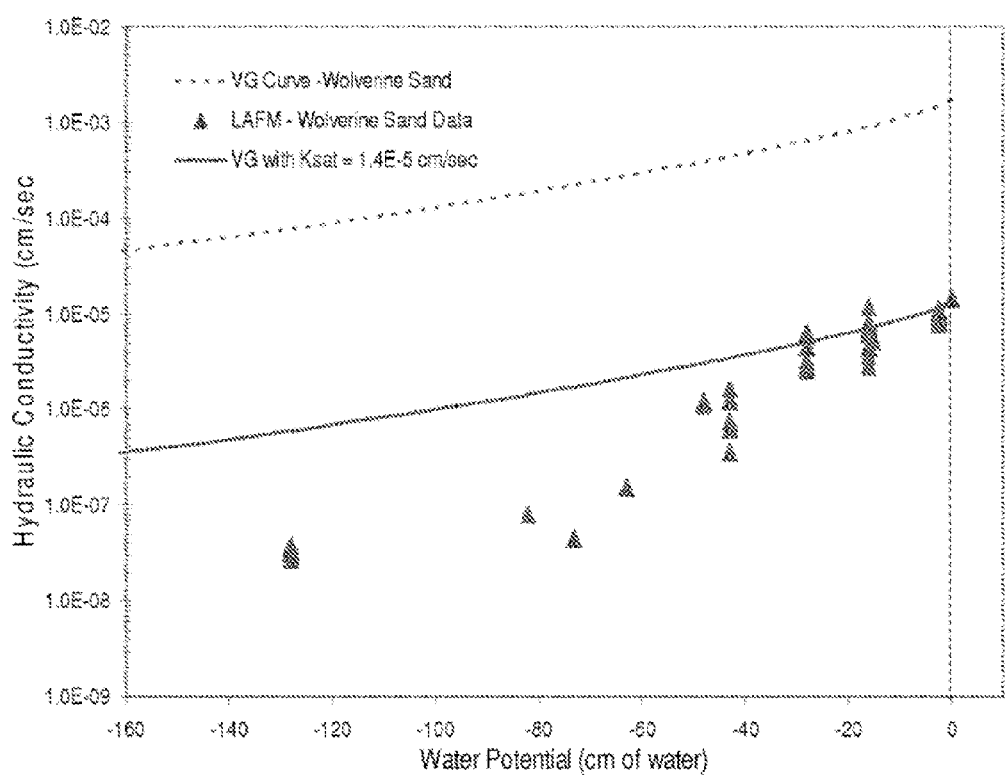
FIG. 4 illustrates unsaturated hydraulic conductivity results from LAFM tests over a range of water potentials for Paul loam.

FIG. 4 illustrates unsaturated hydraulic conductivity results from LAFM tests over a range of water potentials for Paul loam. The characteristic curve for the Paul loam is presented for comparison using the RETC model based on laboratory derived soil moisture characteristic curve and saturated hydraulic conductivity (van Genuchten et al., 1991).

Vacuum Source

The vacuum source can be a laboratory supplied pressure and vacuum. Alternatively, the vacuum source may consists of a 7.5 L pressure/vacuum tank, a rotary vane pump (Welch Vacuum, Skokie, Ill.; Model 2545 B-01), an Ashcroft pressure control switch (Model Milford, Conn.), and a Siemans Energy and Automation series SD44 Nullmatic pressure regulator (Moore Products Co., Spring, Pa.).

Reservoirs

The sample reservoirs are comprised of two identically constructed, transparent reservoirs placed in contact to the top and bottom of the sediment, rock or other porous material that is being tested. The reservoirs consist of acrylic tubes 73.80 mm long with a 63.53 mm outer diameter and a 52.15 mm inner diameter (FIG. 1). One end of the reservoirs (FIG. 1, insert) was machined to fit a 1 mm thick, nominal 0.2-micron pore size, 52.05 mm diameter porous stainless steel disc (Mott Metallurgical Corp., Farmington, Conn.), sized to fit closely inside of the brass sampling ring and bonded to the acrylic tubing using Loctite™ U-05FL urethane adhesive (Rocky Hill, Conn.).

Gaskets

The reservoir's distal end was sealed with a number 10½ or 11, 1-holed rubber stopper connected to a barbed fitting and 6.36 mm OD polyethylene tubing. The tubing was connected to the exterior of the stopper with a slip fitting while the interior portion of the stopper had a tee or L-fitting to prevent water leakage out from the interior of the reservoir, into the tubing.

Porous Plates

Porous stainless steel plates were chosen with hydraulic conductivities that exceeded 2E-5 cm sec$^{-1}$ (>600+cm yr$^{-1}$) to not impede flow through the sediment over the range of measured unsaturated hydraulic conductivities. Both upper and lower reservoirs had the same connectors, tubing and tubing lengths. The porous plates have bubbling pressures, when saturated with water, greater than the anticipated vacuum to be applied for the tests. Other fluids could be used by this methodology.

Pressure Transducer

A number of pressure sensors can be utilized. One such example is a pressure sensor such as described in U.S. Pat. No. 4,520,657 (incorporated herein by reference) can be used to record the pressure in the tubing and reservoirs.

Data Logger

A number of data loggers can be utilized. One exemplary data logger is a CR23X data logger (Campbell Scientific, Inc., Logan, Utah) on 1 to 34 minute intervals.

Tubing/Connectors

Flexible tubing with impermeable walls comprised of any one of a multitude of plastic material as is known in the literature and inflexible plastic or metal connectors were used in these tests.

Methods

The LAFM test was conducted by first wetting the porous plates under a vacuum so they are saturated, adding a small volume of water in the top and bottom reservoirs (2-15 ml); and weighing each reservoir separately with a high-precision, high-accuracy scale (Denver Instruments, Denver, Colo., Model TR-403, 0.001 g readability). The two reservoirs were connected to the vacuum source and the pressure set to the equivalent pressure at the water potential measured in the sediment. The porous reservoir membranes were placed in contact with the sediment, and tape wrapped around the contact between the reservoirs and core to minimize water evaporation (FIG. 3-1). Tape was used to seal between the core and reservoirs for all of the LAFM tests. Other sealants were evaluated following the LAFM tests to determine if other sealants were more effective than the tape in reducing evaporative losses from the reservoirs and core. The reservoirs and sediment sample are placed upright on a laboratory rack, so they rest on the bottom reservoir, and 1.1 kg weight was placed on top of the upper reservoir to ensure hydraulic connection of the sediment to the reservoirs. An equal vacuum was applied in the two reservoirs by the tubing connected to the pressure regulator. A small volume (~1 cm$^3$) of water was placed in the horizontal tubing between the reservoirs and regulator to indicate air leakage anywhere within the apparatus. If water movement in the tubing was observed indicating air leakage through the plates or apparatus, the test was stopped, the porous membranes rewetted, and the test restarted. Tubing clamps were used to prevent airflow in the tubing during test set up, measurements and between tests.

Vacuum and temperature were recorded by a CR23X data logger (Campbell Scientific, Inc., Logan, Utah) on 1 to 34 minute intervals. Pressure was kept within about ±2 cm of the desired pressure at temperatures of 22±2° C. Water levels were observed periodically and when levels decreased in the upper reservoir and increased in the lower reservoir, or after a specified time interval, the test was stopped. Time was recorded, the pressure tubing clamped off, the reservoirs removed from connection with the core, and the mass of the top and bottom reservoirs (with contained water) measured. The average rate of change in the mass of water in the two reservoirs over the test period was used to determine the flow rate and ultimately the unsaturated hydraulic conductivity of the sample, for an applied pressure.

In typical ambient flux determinations, this test would be conducted once or twice at the same ambient pressure. However, for this evaluation and demonstration, multiple tests were conducted over a range of water potentials representative of possible field values to show the repeatability of the readings, and demonstrate the efficacy of the technique. Tests were initially conducted in the dry range, the samples wetted using the technique described in the "Unit Gradient Determination" section and tests repeated at progressively higher water potentials until the samples were saturated.

This flux measurement technique relies on measuring changes in mass within the two water reservoirs. The mass changes in the reservoirs are very small (~0.05 g) in the dry water potential range (−100 to −300 cm range) but have larger mass changes (1-25 g) in the high water potential range (−2 to −12 cm). Water moves from the upper reservoir into sediment and from the sediment into the lower water reservoir. At lower water potentials (relating to lower water contents in the sediment) a very small mass of fluid water will be moving so any water losses in the experiment can adversely influence the results (e.g. 1 drop of water weighs about 0.04 g).

Sealing

Sealing mechanisms between the water reservoirs and core tube were evaluated including the electrical type tape used for all of the LAFM tests, a thick rubber mastic tape, and o-ring seals. The apparatus was set up as shown in FIG. 3-1, but with just an air filled core tube (no sediment was in the core tube that could absorb water) that was sealed with the respective sealant. The reservoirs were placed under a partial vacuum for a time period to document the moisture losses from to both reservoirs. Heavy duty vinyl electrical tape (Scotch, 10 mil), self fusing mastic tape (Wireless Solutions, part number MT-469-2 or Scotch 2228 and 2229) and compression o-ring seals were used independently to seal between the water reservoirs and the brass core tubes. Tests were conducted without the soil sample in the sample ring to quantify the probable liquid water losses from the two water reservoirs.

A second set of top and bottom reservoirs was constructed to test the effectiveness of o-ring seals between the reservoir and the brass sample ring. The design of the reservoirs and the configuration of the tubing were nearly identical to the ones described above with the reservoirs sized to contain an o-ring between the reservoirs and the interior of the brass sleeves (FIG. 1, insert). The rubber stoppers on the reservoirs were replaced with plastic caps with interior o-ring seals and a threaded barbed fitting connecting to the flexible tubing. A vertical tube in the cap has perpendicular holes near the top of the fitting to prevent water loss from the reservoir into the flexible tubing.

Sediment Samples Used for Technique Demonstration

Two locally derived sediments were chosen to demonstrate this technique. Paul loam and Wolverine sand (USDA classification of sandy loam and sand, respectfully) were tested. Paul loam was obtained from a shallow excavation at T2N R38E Sec. 15 SW, SW, NE, 1 mile east of Idaho Falls. Surficial sediments were removed to about one meter depth and then multiple core samples withdrawn from the same depth interval within a 0.3 m by 1.0 m area. Wolverine sand was collected from a dune deposit at the University Place facility in Idaho Falls, Id. at T2 R38 Sec. 12 NE, SW, SW. A 10 cm diameter borehole was augured to a one m depth and samples were collected consecutively with depth. Ring samples (53.54 mm diameter by 60 mm length) were obtained at both sites with a Soil Moisture Equipment Model 0200 soil core sampler (Goleta, Calif.). Multiple sediment core samples were collected at each site and were visually evaluated to determine their suitability for laboratory analysis (coherence, presence of roots, clasts or voids that could influence the results). Samples were immediately sealed with fitted plastic caps, wrapped with vinyl electrical tape, transported to the laboratory, and placed in a refrigerator at 3° C. to minimize biologic activity until tested. Care was taken during sampling and handling to minimize compaction and disturbance of the sample. We used undisturbed soil samples for all of the LAFM tests.

Visually representative single cores of the Paul loam and Wolverine sand were selected to conduct the LAFM tests. Two duplicate samples were selected for analysis of physical properties, soil water characteristic curve data (water content $\{\theta\}$ versus $\psi$) and saturated hydraulic conductivity and sent to DB Stephen and Associates (Albuquerque, N. Mex.) for analyses.

Saturated hydraulic conductivity of the undisturbed cores was measured following the LAFM tests using a constant head test (ASTM D 2434-68). Physical properties were evaluated using standard methods ASTM D 422-63(90), 854-92, D2325-68, 4318-93, and D6836-02. Saturated hydraulic conductivity and the soil moisture characteristic curve (water content versus water potential) data were input into the curve fitting model of van Genuchten (1980) to estimate the unsaturated hydraulic conductivity over a range of water contents or water potentials (Hubbell et al., 2004). The flux rates or unsaturated hydraulic conductivity will be discussed in relation to water potential pressure measurements (in the pressure units of equivalent cm of water pressure) because water potential is commonly measured with field sensors like advanced tensiometers. Synthetic ground water (576 μSiemens cm$^{-1}$) was used in the experiments with 0.5 g of thymol added to four liters of water to inhibit microbial growth during tests. The water used in these tests was assumed to have a mass density of 1.0 g cm$^{-3}$.

Several days prior to the LAFM testing, the core samples were placed in an inverted orientation in the refrigerator. The samples were uncapped and the top and bottom pared, to facilitate hydraulic connection with the water reservoir porous plates to conduct the LAFM test at the ambient water potential.

Unit Gradient Determination

An apparatus and methodology are described that were used to verify that a unit gradient existed in the sample to allow the LAFM technique to be used on archived cores. A technique was required to verify that the samples were under a unit gradient at the start of each LAFM test at the progressively greater water potentials.

A unit hydraulic gradient was created in the core samples by adding water around the top perimeter of the core, allowing the moisture to imbibe and redistribute by gravity. Two tensiometers connected with a differential pressure sensor between them (FIG. 2) were filled with deaired water and placed on the top and bottom of the core sample. The tensiometers and core were wrapped with tape (0.23 mm thick) at their contact to minimize evaporative water losses. The apparatus was oriented vertically and a 1.1 kg weight placed on top of the upper tensiometer to facilitate hydraulic connection with the core sample and the bottom tensiometer was held upright with a clamp. Water potential measurements were obtained with the two tensiometers until they produced the same water potential readings at the top and bottom of the core (i.e. unit gradient) and then the tensiometers were removed from the core and the LAFM tests conducted on the core.

The tensiometers were constructed with high flow porous ceramic plates (Soil Moisture Corporation, Model 604, B01M03, Goleta Calif.), with small water volumes, and were filled with deaired water to minimize equilibration time with the soil core. The porous plates were nearly the same diameter as the core. Differential pressure sensors (Honeywell, Freeport, Ill.; Model 26PCCFA6D, ±15 psid referenced to atmospheric pressure) were used to measure the water potential at the top and bottom of the core with a third identical differential sensor positioned at the center of the core to document uniform water potential throughout the core. Sensors were calibrated using a hanging water column prior to use and referenced to atmospheric pressure regularly between experiments.

A test was conducted to confirm that the pressures applied by the reservoirs contacting the top and the bottom of the core produced the same pressures in the center of the core. A 6.5 mm OD porous ceramic tensiometer was placed in the center of the core and the pressure measured using a pressure sensor connected via a syringe needle/septum similar to the Tensimeter™ system (Soil Measurement Systems, Tucson, Ariz.). Soil water potential measurements were obtained from the center of the core over an eight-day period and compared to the tension applied to the ends of the core using the pressure reservoirs.

Results and Discussion

Ambient Pressure Core Results

The ambient pressure tests are typically conducted one to three times on the core to determine the flux rate in the vadose zone at the in situ field conditions. Water under tension in the upper reservoir is pulled through the porous plate and into the core as water in the bottom of the core flows through the lower porous plate into the lower reservoir. Thus, for homogeneous sediment, there is a net loss of fluid in the upper reservoir and a net gain in the lower reservoir that should be equal. The ambient water potential measurements are presented and discussed, followed by measurements taken over a wide range of water potentials.

Three ambient pressure tests were conducted on the Paul Loam at −258 cm water potential for time periods of three to more than seven days. Measured unsaturated hydraulic conductivity ranged from 1.8 to 2.3E-8 cm sec$^{-1}$ (0.6 to 0.7 cm yr$^{-1}$) with a standard deviation of 2.5 E-9 cm sec$^{-1}$. The ambient pressure analyses for this investigation do not represent deep flux because these samples were collected from shallow depths, but the ambient measurements are emphasized here because they are the primary measurements for deep vadose zone investigations. Data for the ambient tests are presented in FIG. 3 and Table 1. The mass changes between the top and bottom reservoirs are not equivalent, with the top reservoir typically loosing more water than the bottom reservoir gained. This is due to water loss over the course of the test by evaporation from both reservoirs and the core. These water losses and implications are discussed further in the following section entitled "Mass Variation Between the Top and Bottom Reservoirs". Evaporative losses in the upper and lower reservoirs were measured and determined to be nearly the same, so an average core hydraulic conductivity is calculated by combining the change in mass from both the upper and lower reservoirs. These averaged data are presented in Tables 1 and 2 and FIGS. 3 and 4.

The ambient water potential (measured at −128 cm of water pressure) and corresponding K(ψ) for the Wolverine Sand is presented in FIG. 4 and Table 2. Six repeat measurements were obtained over time periods of five to 12 days. The mean hydraulic conductivity ranged from 2.7 to 3.8 E-8 cm sec$^{-1}$ (0.86 to 1.2 cm yr$^{-1}$) with a standard deviation of 4 E-9 cm sec$^{-1}$.

Unsaturated Hydraulic Conductivity Results from Saturation to Ambient Water Potential Measurements of K(ψ) were obtained from the ambient water potential (driest) to near saturated conditions. Data will be discussed below from wettest to driest measurements. The Paul Loam LAFM test results are presented in FIG. 3-3 and Table 3-1 over the range of −5.8 to −258 cm water potential. The unsaturated hydraulic conductivity ranged from 1.5E-5 near saturation to 1.8E-8 cm sec$^{-1}$ at the −258 cm water potential (470 to 0.6 cm yr$^{-1}$). The test durations ranged from less than one day, near saturation, to over 10 days at the lowest water potential. Results of particle size analysis, bulk densities and saturated hydraulic conductivities for the Paul Loam sediment are presented in Table 3.

The unsaturated hydraulic conductivity curve calculated using the RETC model (van Genuchten et al., 1992) for the Paul Loam from a collocated sample is included for comparison in FIG. 3-3 and Table 3-4. The RETC curve estimate is greater than the LAFM measured hydraulic conductivity in the wet range, but converges to the laboratory test value at about −150 cm. The RETC curve estimate is less than LAFM measured hydraulic conductivity by an order of magnitude at the lowest measured water potentials. The Paul loam measurement and RETC curve show an increase in unsaturated hydraulic conductivity as saturation is approached.

LAFM tests on the Paul loam were repeated several times at four different pressures (Table 1). Replicate tests indicate the least variability in the dry range and greatest in the wet range near saturation. The measured results varied by a factor of 1.2 to 2.9 over the range of water potentials tested. These variations for repeat tests are discuss in greater detail in the section entitled "Sources of Measurement Variability".

The volumes of water (mass) that entered and exited the Paul Loam samples are shown in Table 1. This water volume ranged from less than 0.25 g for the lower water potentials to 4.0 g at high water potentials. With a porosity of 0.31, between 3% and 11% of the maximum effective pore volume for each core was replaced during the tests.

The Wolverine Sand flux measurement runs were conducted over −2.5 to −128 cm of water pressure. The upper portion of Table 2 presents ambient readings (−128 cm water potential) followed by results from all the repeat measurements at multiple water potentials. Results of particle size analysis, bulk densities and saturated hydraulic conductivities for the Wolverine Sand sediment are presented in Table 4.

Laboratory measured unsaturated hydraulic conductivity values (flux) ranged from 1.4E-5 cm sec$^{-1}$ at saturation (0 cm water potential) to 2.7E-8 cm sec$^{-1}$ at −128 cm water pressure (0.8 to 434 cm y$^{-1}$) and are presented as solid triangles in FIG. 4 for the Wolverine Sand. Multiple tests were conducted at specified water potential to document repeatability of the results for this technique. The data show slightly more variation in test results over the wet range than at the lower water potentials; however, the number of tests at any given pressure were biased toward the wet range, due to the shorter duration of those tests. Test intervals ranged from a few hours, near saturation, to over two weeks at lower water potentials. Table 2 presents data for individual tests including the mass changes from the top and bottom reservoirs, and summary statistics (mean and coefficient of variation [i.e. standard deviation/mean]) for each group of tests at the applied pressure.

Data for the RETC simulated $K_u$ curve for a collocated Wolverine Sand sample are presented as a dashed line in FIG. 4. The calculated unsaturated hydraulic conductivity curve was derived using the van Genuchten model (1980) from laboratory measured soil moisture characteristic curve data ($\psi$ vs. $\theta$) and the saturated hydraulic conductivity ($K_s$). Table 4 presents the fitting parameters generated from the RETC model (van Genuchten et al., 1991) presented for reference for the collocated sample. These $K_u$ estimates exceed the measured LAFM results by nearly three orders-of-magnitude over the range of measurements. The differences between the measured and estimated data may be due to textural variations between the two collocated samples, although no visual textural variations were observed between the samples; however, the difference might be due to the higher saturated hydraulic conductivity measured in the sample used for the RETC model. Disturbance of the collocated core, or channeling along the core's sidewalls during the saturated hydraulic conductivity test, could result in over estimation of saturated hydraulic conductivity. As an alternative approach, the saturated hydraulic conductivity measured from the LAFM sample is combined with the van Genuchten parameters determined from the collocated sample. The second curve (solid) presents a $K_u$ relationship with a much closer fit to the measured LAFM data. If the saturated hydraulic conductivity test produced a non-representative result, it offsets the entire $K_u$ curve by the error imparted from the $K_s$ measurement. The LAFM technique relies on unsaturated flow through the sample, so it is less likely to be biased by channeling or preferential flow that can occur when the sample is saturated. Using the lower $K_s$ with the RETC modeled curve more closely approximates the laboratory measurements.

The mass of water exchanged between the core sample and the two test reservoirs are presented in Table 2. Flow volumes into or out of the Wolverine sand ranged from less than 0.5 g at low water potentials to 25 g near saturation. This indicates 2% to 60% of the core sample total effective liquid pore volume was replaced during the tests with the larger volume percent produced from the higher water potential range tests.

LAFM tests for the Wolverine Sand were replicated several times at six different pressures (Table 2). Repeat measurements of unsaturated hydraulic conductivity varied by a factor of 1.4 to 4.7 for any specific water potential.

Mass Variation Between the Top and Bottom Reservoirs

The upper reservoir generally had greater mass changes than the bottom reservoir for both sediment samples over all the water potentials tested (Tables 1 and 2). This systematic difference is believed to be primarily from evaporative loss of water from the water reservoirs and the core samples. The mass of the entire apparatus (reservoirs and core) was measured and was found to decrease over time. Subsequent tests indicated the upper reservoir had the greatest mass loss (flow into the soil minus evaporative loss), the core had a small loss (flow in and out with evaporative loss), while the lower reservoir gained mass (flow into the reservoir minus evaporative loss), due to the vertical downward water flow within the apparatus. Total mass changes between the top and bottom reservoirs varied the most for the longer term, lower water potential tests, while they were nearly the same (mean difference 0.92) at high water potentials. Water loss due to evaporation from the top reservoir could cause the hydraulic conductivity to be overestimated, while water loss from the lower reservoir would cause the hydraulic conductivity to be underestimated. Tests with the LAFM apparatus where the soil was not contained in the core tube, indicated that losses were nearly the same in the top and bottom reservoirs while using the tape sealant (Table 5). The average flux rate for the core is calculated by averaging the mass change from the two reservoirs to produce a mean unsaturated hydraulic conductivity or flux rate.

The ratio of water loss between the top and bottom reservoirs (top mass loss/bottom mass loss) with the tape seal used for the LAFM tests ranged from 0.79 to 1.38, with a mean ratio of 1.00 based on five replicates over a range of water potentials (Table 3-5). This suggests that the assumption of near equivalent losses between the two reservoirs used for these tests is satisfactory. Since the evaporative losses are similar between the upper and lower reservoirs, their mass changes can be averaged to provide a mean unsaturated hydraulic conductivity based on water transfer from reservoirs.

The potential for water loss for the tape, mastic and o-ring sealants was tested with an air filled core tube with the data presented in Table 6. The rubber mastic sealant showed the least water loss at 0.0059 g day$^{-1}$, the o-rings had a loss at 0.014 g day$^{-1}$ and the tape had the greatest loss of 0.026 g day$^{-1}$. These losses are only significant to the results if mass measurements are obtained only from either the upper or lower reservoirs; however, because the losses are nearly equivalent from both reservoirs, the losses are factored out by averaging the mass changes from both reservoirs to obtain the mean unsaturated hydraulic conductivity. This calculated value is representative of the flux through the entire core. The total evaporative losses are relatively small (0.026 g day$^{-1}$) compared to the total mass changes at the higher water potentials (~12 g day$^{-1}$).

Sources of Measurement Variability

Multiple LAFM tests were conducted at specified pressures to indicate the variability inherent to the technique. Table 1 and FIG. 3 shows the variability of the Paul Loam test data over the range of −258 to −6 cm water pressure. The variability in repeat measurements for the Paul Loam at specific pressures was within a factor of 1.2 (maximum K/minimum K) at low water potentials and increased to a factor of 2.9 at higher water potentials. Table 2 and FIG. 4 show the variability for the data from the Wolverine Sand over the range of −128 to −2.5 cm. The Wolverine Sand potential varied by a factor of 1.4 at lower water potentials and increased to 4.7 at higher water potentials. Thus, the Wolverine sand had a similar increase in variation between repeat measurements as the pressure approached higher water potentials, only with greater variation than observed from the Paul Loam tests.

Variability in flux calculations for repeat measurements at a specified water potential can occur from one or a combination of factors. Compaction of the sample, disturbance of the surface of the sample from repeated handling, differing hydraulic connection with the core, pressure variations over the test period, the possibility of the uniformity of the pore sizes in the sample producing a range of $K_\psi$ for a given water potential and changes in evaporative losses can influence the results of the tests.

Compaction and disturbance of the sample, as well as a change in the hydraulic connection occurs as the apparatus is disassembled to weigh the reservoir/water mass and then reassembled for repeat measurements. The vertical physical configuration and the addition of weight to improve connection to the sample increases the potential to compact the core but also facilitates an improved hydraulic connection. The reassembly may disturb and smear or compact the soil, lowering the hydraulic conductivity, or may provide a poor or incomplete connection. Contact between the core and reservoirs was optimized by carefully paring the sample to increase the contact area between the surface of the core and the porous plates and by placing a weight on top of the upper reservoir while the apparatus sat on the base of the lower reservoir so good contact was made between both sides of the core and the porous plates on the reservoirs.

Variations in the applied pressure (partial vacuum) over the test occurred because the regulator was referenced to atmospheric pressure (which changes continuously). FIG. 3-5 shows that the pressure regulator held the pressure head stable (within a few cm) for days relative to the barometric pressure; however, barometric pressure changes are a greater concern for longer test intervals or at lower applied pressures. If the barometric pressure changes significantly over the test period, the pressure applied over the core also changes by the magnitude of the change. This will have the greatest influence over the high water potential range (near saturation) because of the sensitivity of $K_u$ to small changes in pressure in this range. The use of a regulator referenced to absolute pressure while sealing between the reservoirs/core (or using air/water tight seals) would hold the pressure steady over time.

The grain size distribution of the samples may also influence the LAFM results if the material has a large percentage of a single grain size (as does the Wolverine sand having about 80% fine sand). A prevalent grain size in the sediment can cause the $K_u$ curve to have a horizontal plateau where a single applied water potential can produce a range of unsaturated hydraulic conductivity values.

Water can be lost to evaporation while setting up, running, or making the measurements in either reservoir. The losses are relatively small, but at low flux rates, can bias the results. This potential bias was minimized by performing measurements quickly during set up and break down of the test. This influence could be further reduced by conducting the tests in a high humidity chamber that reduces evaporation from the surface of the reservoir porous plates, and/or by improving the seals between the reservoirs and core.

The steady state ambient water potential approximates the ambient flux at the time of sample collection. However, this test can be conducted at other specified water potentials. Laboratory tests were conducted over a range of water potentials from near saturation to about −260 cm in a sandy loam and loam that resulted in flux estimates between 300 and 0.5 cm yr$^{-1}$, a range representative of field conditions in many deeper vadose zones. This technique may be used on archived core of either sediment or rock that has been suitably stored (sealed and cooled) to minimize evaporative fluid losses and damage from microbial effects. The technique can have particular value for estimating deep flux in vadose zones were where the water potentials are nearly invariant.

TABLE 1

Results from LAFM tests on Paul loam with summary statistics (mean pressure, standard deviation and coefficient of variation) for repeated tests at arbitrary water potentials. The mean applied pressure and coefficient of variation are in bold fonts.

| | | Mass change (g) | | | | Pressure Range Statistics | |
| --- | --- | --- | --- | --- | --- | --- | --- |
| Psi(cm water) | Test time (d) | Top | Bottom | Mean K (cm sec$^{-1}$) | Mean K (cm yr$^{-1}$) | Mean K(ψ) (cm sec$^{-1}$) Mean Pressure | Standard deviation (cm sec$^{-1}$) CV |
| Flux at Ambient Water Potential | | | | | | | |
| −258 | 3.4 | −0.27 | −0.03 | 1.80E−8 | 0.57 | 1.98E−8 | 2.51E−9 |
| −258 | 5.9 | — | 0.051 | 2.26E−8 | 0.71 | −257.7 | 6.14 |
| −258 | 7.3 | — | −0.09 | 1.87E−8 | 0.59 | | |
| Flux at Various Water Potentials | | | | | | | |
| 0 | | Falling head test | | 1.90E−6 | 60.0 | | |
| −6 | 0.9 | — | 1.266 | 7.37E−07 | 23.3 | 5.78E−7 | 1.37E−7 |
| −6 | 0.9 | — | 0.951 | 5.02E−07 | 15.9 | −4.7 | 14.6 |
| −6 | 0.9 | — | 0.563 | 3.53E−07 | 11.2 | | |
| −17 | 2.6 | — | 0.697 | 2.38E−07 | 7.53 | | |
| −17 | 3.4 | — | 2.223 | 3.97E−07 | 12.5 | | |
| −17 | 1.8 | — | 0.839 | 2.86E−07 | 9.04 | 2.99E−7 | 8.18E−8 |
| −17 | 2.1 | — | 1.277 | 3.59E−07 | 11.4 | −17.7 | 3.17 |
| −17 | 1.8 | — | 1.112 | 3.71E−07 | 11.7 | | |
| −17 | 1.8 | — | 0.863 | 3.34E−07 | 10.6 | | |
| −45 | 4.1 | — | 0.195 | 4.896E−8 | 1.5 | 9.48E−8 | 4.59E−8 |
| −45 | 1.9 | — | 0.234 | 9.48E−7 | 3.0 | −42.7 | 1.25 |
| −45 | 4.1 | — | 1.073 | 1.40E−7 | 4.4 | | |
| −82 | 8.0 | — | 0.215 | 4.40E−8 | 1.4 | −82.8 | 0.95 |
| −129 | 10. | — | 0.094 | 2.08E−8 | 0.66 | −129.3 | 0.1 |
| −168 | 5.8 | — | 0.07 | 2.54E−8 | 0.80 | 3.8E−8 | |
| −168 | 8.0 | — | 0.215 | 5.06E−8 | 1.6 | −164.7 | 8.11 |
| −258 | 3.4 | −0.27 | −0.03 | 1.80E−8 | 0.57 | 1.98E−8 | 2.51E−9 |
| −258 | 5.9 | — | 0.051 | 2.26E−8 | 0.71 | −257.7 | 6.14 |
| −258 | 7.3 | — | −0.09 | 1.87E−8 | 0.59 | | |

TABLE 2

Results from LAFM tests on Wolverine sand with summary statistics (mean pressure, standard deviation and coefficient of variation) for repeated tests at arbitrary water potentials. The mean applied pressure and coefficient of variation are in bold fonts.

| Psi (cm water) | Test time (d) | Mass change (g) Top | Mass change (g) Bottom | Mean K (cm sec$^{-1}$) | Mean K (cm yr$^{-1}$) | Pressure Range Statistics K($\psi$) (cm sec$^{-1}$) Mean pressure (cm water) | Standard deviation (cm sec$^{-1}$) |
|---|---|---|---|---|---|---|---|
| *Flux at Ambient Water Potential* ||||||||
| −128 | 12.3 | −2.53 | 0.495 | 3.28E−8 | 1.03 | | |
| −128 | 16.4 | −1.708 | 0.405 | 3.80E−8 | 1.20 | | |
| −128 | 5.7 | −0.652 | 0.203 | 2.73E−8 | 0.86 | | |
| −128 | 5.2 | −0.49 | 0.066 | 2.77E−8 | 0.87 | 3.19E−8 | 4.24E−9 |
| −128 | 6 | −0.516 | 0.314 | 3.52E−8 | 1.11 | −127.8 | 5.03 |
| −128 | 7 | −0.574 | 0.266 | 3.05E−8 | 0.96 | | |
| *Fluxes at Various Water Potentials* ||||||||
| 0 | | Falling head Test | | 1.44E−5 | 454 | | |
| −2.5 | 0.16 | −2.229 | 2.569 | 7.75E−6 | 244 | | |
| −2.5 | 0.14 | −2.473 | 1.956 | 8.04E−6 | 253 | | |
| −2.5 | 0.60 | — | 12.162 | 1.08E−5 | 339 | | |
| −2.5 | 0.23 | −4.791 | 6.324 | 1.05E−5 | 332 | | |
| −2.5 | 0.31 | −6.324 | 6.038 | 1.02E−5 | 322 | 9.37E−6 | 9.93E−7 |
| −2.5 | 0.64 | — | 11.788 | 9.56E−6 | 341 | −2.8 | 34.8 |
| −2.5 | 0.71 | −12.86 | 12.808 | 9.25E−6 | 334 | | |
| −2.5 | 0.80 | −15.32 | 15.074 | 9.62E−6 | 335 | | |
| −2.5 | 0.96 | −16.87 | 16.532 | 8.87E−6 | 279 | | |
| −15 | 0.85 | −9.366 | 7.749 | 5.10E−6 | 160 | | |
| −15 | 0.35 | −2.242 | 2.609 | 3.53E−6 | 111 | | |
| −15 | 0.55 | −3.343 | 2.736 | 2.84E−6 | 89.4 | | |
| −15 | 0.29 | −4.801 | 4.338 | 8.13E−6 | 256 | | |
| −15 | 0.79 | — | 11.325 | 7.51E−6 | 236 | | |
| −15 | 0.25 | −3.199 | 2.726 | 6.10E−6 | 192 | 6.28E−6 | 2.22E−6 |
| −15 | 0.72 | — | 8.281 | 6.48E−6 | 204 | −16.4 | 7.4 |
| −15 | 0.94 | — | 12.459 | 7.26E−6 | 229 | | |
| −15 | 0.93 | — | 12.615 | 7.05E−6 | 222 | | |
| −15 | 1.10 | — | 15.576 | 6.95E−6 | 219 | | |
| −15 | 1.11 | −9.16 | 9.584 | 4.31E−6 | 135 | | |
| −15 | 0.99 | −12.92 | 12.273 | 6.47E−6 | 204 | | |
| −15 | 1.10 | — | 25.209 | 1.17E−5 | 369 | | |
| −15 | 0.68 | −6.364 | 5.711 | 4.51E−6 | 142 | | |
| −28 | 1.7 | −7.642 | 7.642 | 5.87E−6 | 179 | | |
| −28 | 1.0 | | 12.18 | 6.26E−6 | 197 | | |
| −28 | 0.5 | −4.599 | 4.404 | 4.54E−6 | 140 | 4.16E−6 | 1.56E−6 |
| −28 | 0.4 | −2.582 | 2.328 | 2.78E−6 | 86.7 | −28.1 | 1.43 |
| −28 | 1.0 | −5.238 | 4.957 | 2.56E−6 | 80.9 | | |
| −28 | 1.1 | −7.1 | 6.847 | 3.27E−6 | 103 | | |
| −43 | 1.0 | −1.59 | 0.754 | 6.04E−7 | 19.1 | | |
| −43 | 1.9 | −6.256 | 5.753 | 1.6E−6 | 52.1 | | |
| −43 | 1.1 | −1.694 | 1.558 | 7.34E−7 | 23.1 | | |
| −43 | 1.9 | −2.723 | 2.661 | 7.26E−7 | 22.9 | | |
| −43 | 1.2 | −2.96 | 2.746 | 1.26E−7 | 39.8 | | |
| −43 | 0.9 | −2.186 | 2.133 | 1.19E−7 | 37.7 | | |
| −43 | 0.9 | −0.683 | 0.588 | 3.51E−7 | 11.1 | | |
| −43 | 2.1 | −3.137 | 2.863 | 7.44E−7 | 23.5 | | |
| −48 | 3.3 | −7.57 | 6.611 | 1.11E−6 | 34.9 | 1.5E−6 | |
| −48 | 1.6 | −3.956 | 3.735 | 1.21E−6 | 38.2 | −48.3 | 8.2 |
| −62 | 7.0 | −2.839 | 0.176 | 1.28E−7 | 4.06 | −62.9 | 1.25 |
| −73 | 6.8 | −0.724 | 0.465 | 4.46E−8 | 1.41 | −73.3 | 0.29 |
| −82 | 6.6 | −1.797 | 1.072 | 7.91E8 | 3.50 | −82.4 | 1.09 |
| −128 | 12.3 | −2.53 | 0.495 | 3.28E−8 | 1.03 | | |
| −128 | 16.4 | −1.708 | 0.405 | 3.80E−8 | 1.20 | | |
| −128 | 5.7 | −0.652 | 0.203 | 2.73E−8 | 0.86 | | |
| −128 | 5.2 | −0.49 | 0.066 | 2.77E−8 | 0.87 | 3.19E−8 | 4.24E−9 |
| −128 | 6 | −0.516 | 0.314 | 3.52E−8 | 1.11 | −127.8 | 5.03 |
| −128 | 7 | −0.574 | 0.266 | 3.05E−8 | 0.96 | | |

TABLE 3

Physical and hydraulic properties of collocated soils.
USDA classification names are in parenthesis.

| Soil Name | Particle size distribution | | | Dry bulk density g cm$^{-3}$ | Particle density g cm$^{-3}$ | Effective porosity cm$^3$ cm$^{-3}$ | Saturated. hydraulic conductivity cm sec$^{-1}$ |
|---|---|---|---|---|---|---|---|
| | Sand % | Silt % | Clay % | | | | |
| Wolverine sand (Sand) | 90 | 7 | 3 | 1.60 1.58* | 2.66 | 0.349 | 1.4E−5 1.8E−3* |
| Paul loam (Sandy loam) | 69 | 24 | 7 | 1.63 1.65* | 2.64 | 0.347 | 1.9E−6 5.7E−4* |

Data from Stephens, D.B. and Associates, Inc., 2005 and 2008*.

TABLE 4

Textural classification and hydraulic properties of sediment from the Wolverine sand and Paul loam. The calculated properties are from sediment samples co-collected from the sample locations (Stephens, D.B. and Associates, Inc., 2008).

| Sample | Group Name | Texture | $\theta_r$ | $\theta_s$ | Ks (cm sec$^{-1}$) | $\alpha$ (cm$^{-1}$) | $\eta$ |
|---|---|---|---|---|---|---|---|
| Paul Loam | ML | Sandy Loam | 0.000 | 0.3717 | 5.7E−04 | 0.0207 | 1.240 |
| Wolverine Sand | SM | Sand | 0.014 | 0.4097 | 1.8E−03 | 0.0081 | 1.5995 |

† Unified Soil Classification System (AGI Data Sheets, 1989).
$\theta_s$ saturated water content,
$\theta_r$ residual water content

TABLE 5

Comparison of top and bottom reservoir water losses at −170 cm tension with an air filled core tube using the tape sealant.

| Top loss g d$^{-1}$ | Bottom loss g d$^{-1}$ | Top − Bottom loss g d$^{-1}$ | Top + Bottom loss/2 | Ratio Top:Bottom |
|---|---|---|---|---|
| 0.0248 | 0.0305 | −0.006 | 0.0277 | 0.81 |
| 0.0365 | 0.0265 | 0.010 | 0.0315 | 1.38 |
| 0.7130 | 0.6996 | 0.013 | 0.7063 | 1.02* |
| 1.4543 | 1.8250 | −0.370 | 1.6396 | 0.79* |
| 0.0212 | 0.0212 | 0.000 | 0.0212 | 1 |
| | | | Mean Ratio | 1.0 |

*Note
that a large water loss in top and bottom from air leak resulted in near equivalent losses in top and bottom reservoirs.

TABLE 6

Mean reservoir losses from the three sealing mechanisms with no sediment samples in the core tube (air filled). This indicates that the mastic has the best seal (least water loss), followed by the O-ring and the tape seal.

| Sealant Material | Reservoir Loss (g d$^{-1}$) | Standard Deviation (g d$^{-1}$) | Number Replicates |
|---|---|---|---|
| Mastic | 0.0059 | 0.0062 | 6 |
| O-ring | 0.014 | 0.012 | 8 |
| Tape | 0.026 | 0.0059 | 6 |

Having described the basic concept of the invention, it will be apparent to those skilled in the art that the foregoing detailed disclosure is intended to be presented by way of example only, and is not limiting. Various alterations, improvements, and modifications are intended to be suggested and are within the scope and spirit of the present invention. Additionally, the recited order of the elements or sequences, or the use of numbers, letters or other designations therefor, is not intended to limit the claimed processes to any order except as may be specified in the claims. All ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like refer to ranges which can be subsequently broken down into sub-ranges as discussed above. Accordingly, the invention is limited only by the following claims and equivalents thereto.

All publications and patent documents cited in this application are incorporated by reference in their entirety for all purposes to the same extent as if each individual publication or patent document were so individually denoted.

I claim:

1. An ambient flux measurement apparatus comprising: a sample container, a pressure transducer, a data logger, a vacuum source, a first gasket, a second gasket, a first tube, a second tube, a third tube, a fourth tube, and a connector;

wherein the sample container is comprised of a top reservoir, a bottom reservoir, a first porous plate, a second porous plate, and a sample chamber, wherein the sample chamber is positioned between the top and bottom reservoir;

wherein the bottom reservoir is a cylinder having an upper section and a lower section;

wherein the top reservoir is a cylinder having an upper section and a lower section;

wherein the sample chamber is a cylinder with an upper section and lower section;

wherein the first porous plate is positioned between the lower section of the sample chamber and the upper section of the bottom reservoir and sealed to the bottom reservoir, and wherein the second porous plate is positioned between the upper section of the sample chamber and the second porous plate sealed to the lower section of the top reservoir, wherein the lower section of the top reservoir is coupled to the upper section of the sample chamber, and the upper section of the bottom reservoir is coupled to the bottom section of the sample chamber;

wherein the lower section of the bottom reservoir has an aperture that permits communication between the inside and outside of the bottom reservoir;

wherein the pressure transducer has a first port, a second port and a data port;

wherein the first gasket is coupled to the aperture located on the lower section of the bottom reservoir creating a seal around the circumference of the aperture on the lower section of the bottom reservoir;

wherein the connector has a first, second and third inlet;

wherein the first gasket has a central aperture, wherein the first tube connects the central aperture of the first gasket with the first inlet of the connector having a first inlet, a second inlet and a third inlet;

wherein the upper section of the top reservoir has an aperture that permits communication between the inside and outside of the bottom reservoir;

wherein the second gasket is coupled to the aperture located on the upper section of the top reservoir creating a seal around the circumference of the aperture on the upper section of the top reservoir;

wherein the second gasket has a central aperture, wherein the second tube connects the central aperture of the second gasket to the first inlet of the pressure transducer;

wherein the third tube connects the second port of the pressure transducer with the second inlet of the connector;

wherein the vacuum source is connected the connector's third inlet data port via the forth tube; and wherein the data logger is connected to the pressure transducer's data port via one or more wires.

2. The apparatus of claim 1, further comprising a pressure regulator that controls the vacuum source.

3. The apparatus of claim 1, further comprising a container stand and wherein the container stand is attached to the sample container via one or more physical connectors to maintain an upright position.

4. The apparatus of claim 1, wherein the first porous plate is coupled to the upper section of the bottom reservoir, and the second porous plate is coupled to the lower section of the upper reservoir.

5. The apparatus of claim 1, wherein the lower section of the top reservoir is coupled to the upper section of the sample chamber forming a first sample container joint, and the upper section of the bottom reservoir is attached to the bottom section of the sample chamber forming a second sample container joint.

6. The apparatus of claim 1, wherein the first and second container joints are sealed with a one or more sealants.

7. The apparatus of claim 1, wherein the first tube sealingly engages the second inlet of the first connector and the aperture of the first gasket.

8. The apparatus of claim 1, wherein the second tube sealingly engages the first inlet of the pressure transducer and the aperture of the second gasket.

9. The apparatus of claim 1, wherein the third tube sealingly engages the second inlet of the pressure transducer and the first inlet of the first connector.

10. The apparatus of claim 1, wherein the fourth tube sealingly engages the third inlet of the connector and the vacuum source.

11. The apparatus of claim 1, wherein coupling between the lower section of the top reservoir and the upper section of the sample chamber, and the coupling between the upper section of the bottom reservoir and the bottom section of the sample chamber are sealed.

12. The apparatus of claim 1, wherein the sample chamber is made of metal.

* * * * *